(12) United States Patent
Abraham et al.

(10) Patent No.: US 6,250,334 B1
(45) Date of Patent: Jun. 26, 2001

(54) CENTERING DEVICE FOR STEERING VALVES

(75) Inventors: Uwe Abraham, Recklinghausen; Alexander Zernickel, Herzogenaurach; Peter Jennes, Cologne, all of (DE)

(73) Assignee: INA Walzlager Schaeffler oHG (DE)

( * ) Notice: Subject to any disclaimer, the term of this patent is extended or adjusted under 35 U.S.C. 154(b) by 0 days.

(21) Appl. No.: 09/464,892

(22) Filed: Dec. 16, 1999

(30) Foreign Application Priority Data

Dec. 21, 1998 (DE) .............................................. 198 58 995
Aug. 6, 1999 (DE) .............................................. 199 37 282

(51) Int. Cl.[7] .............................. F15B 9/10; B62D 5/083
(52) U.S. Cl. ..................................... 137/625.23; 91/375 A
(58) Field of Search ........................ 137/625.21, 625.23; 91/375 R, 375 A

(56) References Cited

U.S. PATENT DOCUMENTS

| | | | |
|---|---|---|---|
| 4,381,799 | * 5/1983 | Sato et al. | 91/375 A X |
| 5,251,669 | * 10/1993 | Bishop | 137/625.23 |
| 5,461,964 | * 10/1995 | Guasch et al. | 91/375 R |
| 5,562,016 | * 10/1996 | Schoffel | 91/375 A |
| 5,571,238 | * 11/1996 | Breitweg et al. | 91/375 A |
| 5,575,193 | * 11/1996 | Bareis et al. | 91/375 A |
| 5,851,006 | * 12/1998 | Spillner et al. | 91/375 A X |
| 5,964,314 | * 10/1999 | Suzuki et al. | 91/374 A X |
| 5,964,315 | * 10/1999 | Suzuki et al. | 91/375 A X |

FOREIGN PATENT DOCUMENTS

| | | |
|---|---|---|
| 43 00 61 2 | 7/1994 | (DE) . |
| 19 80 31 95 | 9/1998 | (DE) . |
| 19 7 217 55 | 11/1998 | (DE) . |

* cited by examiner

*Primary Examiner*—John Rivell
(74) *Attorney, Agent, or Firm*—Bierman, Muserlian and Lucas

(57) ABSTRACT

The invention concerns a centering device for steering valves of automotive vehicles and is characterized in that a needle roller bearing (16) is arranged between the drive shaft (5) and the valve bushing (12), said needle roller bearing (16) having an outer bearing ring (17) which is configured as a thin-walled sleeve which comprises, in at least one peripheral section, an elastically yielding raceway convexity (18) deviating from the circular shape, and said peripheral section comprises an angular groove (22) which is situated radially opposite an angular groove (23) disposed in an associated portion of the drive shaft (5). The needle roller bearing (16) of the invention assures a fine centering to the hydraulic center of the steering valve.

8 Claims, 4 Drawing Sheets

CENTERING DEVICE FOR STEERING VALVES

FIELD OF THE INVENTION

The invention concerns a centering device for a steering valve of an automotive vehicle, said device comprising an elastic torsion bar having a first end portion connected to a drive shaft and a second end portion connected to a driven shaft which is connected to a valve bushing of the steering valve, a rotary slide formed integrally on the drive shaft being inserted in the valve bushing so that, by a limited displacement of the drive shaft relative to the driven shaft, pressure oil can be fed to a servo element.

The invention also concerns a centering device of the aforesaid type in which the rotary slide is supported on cage-guided needle rollers of a needle roller bearing.

BACKGROUND OF THE INVENTION

A centering device of the pre-cited type known from DE 43 00 612 A1 comprises a spring element in the form of a metal folding bellows which is connected at one end to an end element which is fixed on the drive shaft. The other end of the metal folding bellows is connected to a centering element. The centering element which is axially spring-mounted through the metal folding bellows presses through rolling elements against a second centering element which is fixed on an end element. This end element connects the torsion bar to the driven shaft. The fact that the rolling elements roll in angular grooves of the centering elements results in the production of a resetting force which is determined by the relative rotation of the two shafts and is added to the torsional force of the torsion bar. A centering device of this type effects an exact adjustment of the two shafts, and thus also of the steering valve, at the hydraulic center. This prior art centering device is suitable for rotary slide or rotary piston structures and assures a perfect straight-ahead driving behavior.

A drawback of the above construction, however, is that the spring element in the form of a folding bellows is expensive to manufacture and its connection to the centering element and the torsion bar is work-intensive and thus also involves high costs.

OBJECTS OF THE INVENTION

It is therefore an object of the invention to create a centering device which has a substantially uncomplicated structure so that it is also simpler to manufacture.

This and other objects and advantages of the invention will become obvious from the following detailed description.

SUMMARY OF THE INVENTION

The invention achieves the above objects by the fact that a needle roller bearing is arranged between the drive shaft and the valve bushing, said needle roller bearing having an outer bearing ring which is configured as a thin-walled sleeve which comprises, in at least one peripheral section, an elastically yielding raceway convexity deviating from the circular shape, and said peripheral section comprises an angular groove which is situated radially opposite an angular groove disposed in an associated portion of the drive shaft.

The advantage of the invention resides in the fact that a needle roller bearing is utilized as a spring means for producing the resetting force. This resetting force for adjusting the longitudinal valve at the hydraulic center is created by the resilient peripheral sections of the thin-walled sleeve so that the metal folding bellows as well as the first and the second centering elements and the rolling elements arranged therebetween according to the prior art solution are all dispensable. Due to the non-circular peripheral sections with their angular grooves and due to the angular grooves of the drive shaft, a relative rotation of the two shafts releases a resetting force which causes the rolling elements to snap exactly into the angular grooves of the drive shaft and the elastic sleeve, so that a highly precise adjustment of the hydraulic center of the steering valve is obtained. Thus, the needle roller bearing arranged between the drive shaft and the valve bushing fulfils a locking function.

According to a further feature of the invention, the outer bearing ring comprises, in three equally spaced peripheral sections, a raceway convexity deviating from the circular shape. This symmetric configuration results in a particularly uniform distribution of the resetting force.

According to another feature of the invention, the angular groove of the drive shaft is formed by a separate inner bearing ring.

According to still another feature of the invention, the bearing on which the rotary slide is supported is configured as a sliding or a rolling bearing.

In another solution, the invention achieves its objects by the fact that a centering element received in a needle roller bearing and connected to the driven shaft and the torsion bar is arranged between the driven shaft and the torsion bar, said needle roller bearing having an outer bearing ring which is configured as a thin-walled sleeve which comprises, in at least one peripheral section, an elastically yielding raceway convexity deviating from the circular shape, and said peripheral section comprises an angular groove which is situated radially opposite an angular groove disposed in an associated portion of the drive shaft.

In this case, too, according to a further feature of the invention, the outer bearing ring comprises, in three equally spaced peripheral sections, a raceway convexity deviating from the circular shape. This symmetric configuration results in a particularly uniform distribution of the resetting force.

According to still another feature of the invention, the torsion bar and the centering element are configured in one piece with each other. This has the advantage that no force-locked connection has to be made between the torsion bar and the centering element during the assembly of the centering device.

According to a final feature of the invention, the angular groove of the centering element is formed by a separate inner bearing ring.

The invention will now be described more closely with the help of the following examples of embodiment represented in the drawings.

DETAILED DESCRIPTION OF THE DRAWINGS

Figure 1:
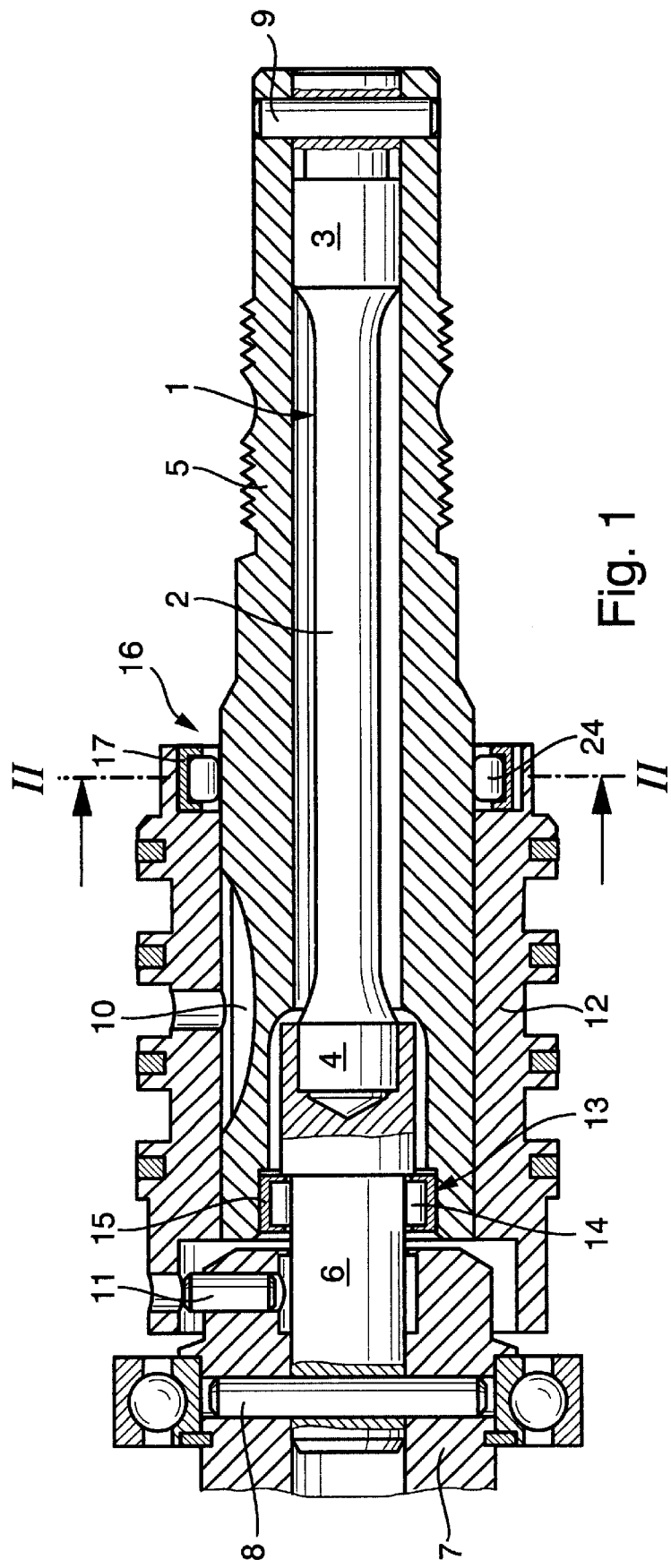
FIG. 1 is a longitudinal cross-section through a rotary slide valve of the invention.

The centering device shown in FIG. 1 comprises a torsion bar 1 whose torsion region 2 having a reduced cross-section merges at each end with a thickened end portion 3 and 4. The end portion 3 is connected by a pin 9 to a drive shaft 5 and the end portion 4 is connected through a centering element 6 with the help of a pin 8 to a driven shaft 7. The connection between the end portion 4 of the torsion bar 1 and the centering element 6 is effected by a press fit. An extension of the drive shaft 5 carries a rotary slide 10. The driven shaft 7 is coupled by a further pin 11 to a valve bushing 12 in which the rotary slide 10 can execute a relative movement for controlling a pressure. The rotary slide 10 and the valve bushing 12 form, in a known manner, a rotary slide valve which routes pressure oil to a servo motor, not shown, via a control groove system. The centering device further comprises a needle roller bearing 13 whose needle rollers 14 support the rotary slide 10 through an outer bearing ring 15. This needle roller bearing 13 may, however, also be configured as a sliding bearing. However, this needle roller bearing 13 does not participate in the fine centering. The centering device comprises a further needle roller bearing 16, which, according to the invention, is arranged between the drive shaft 5 and the valve bushing 12 and effects the fine centering properly speaking.

When, during a steering operation, there is no more torque difference between the drive shaft 5 and the driven shaft 7, the resetting of the rotary slide valve to its hydraulic center is effected by the torsion bar 1. Since, in its central position, the torsion bar 1 provides only a small resetting moment between the rotary slide 10 and the valve bushing 12 (flat spring characteristic), the fine centering is effected according to the invention by a needle roller bearing 16 with a resetting moment which increases strongly within a small range and then decreases on a tapering scale.

Figure 2:
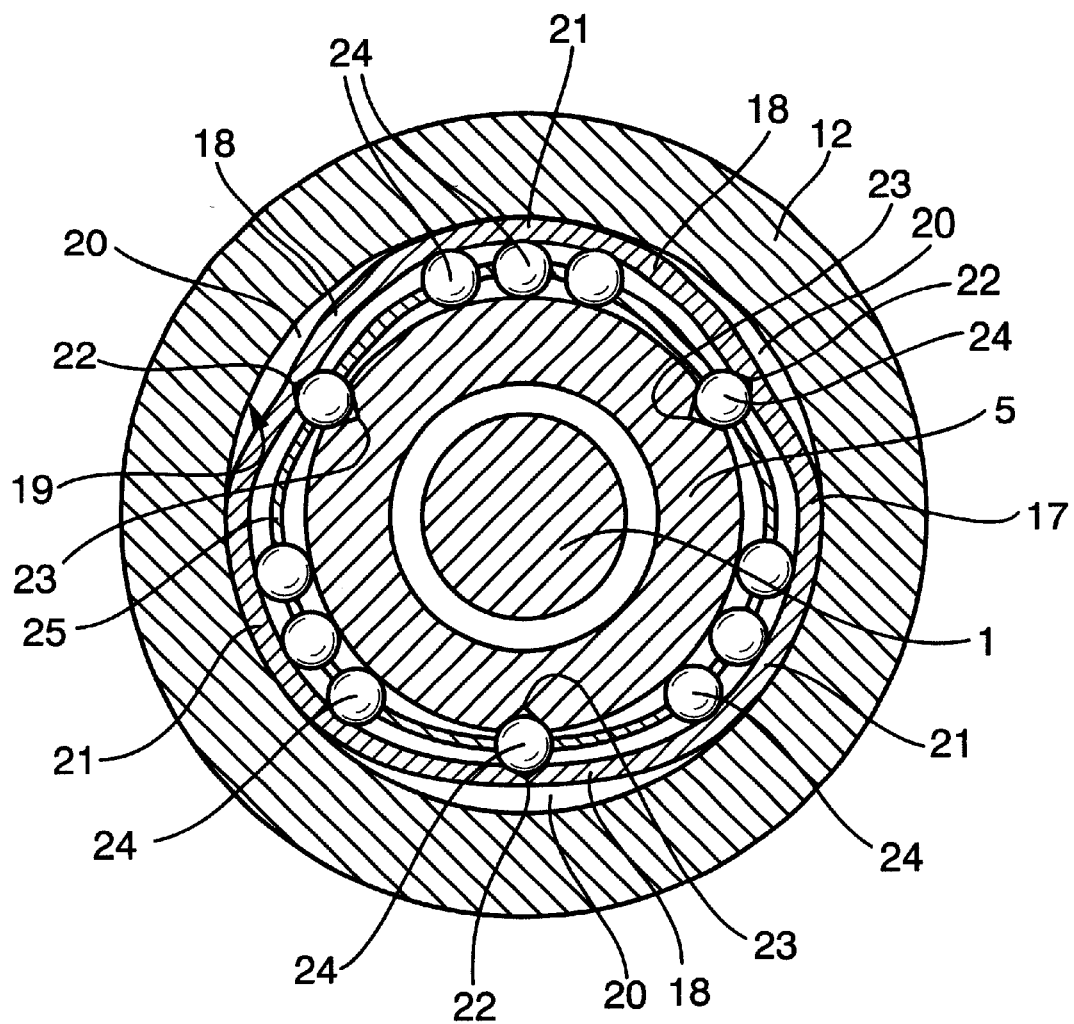
FIG. 2 is a simplified cross-sectional representation along line II—II of FIG. 1 showing the region of the valve bushing in which the needle roller bearing of the invention is arranged.

As can be seen in FIG. 2, the outer bearing ring 17 which is made without chip removal as a sleeve of uniform wall thickness comprises, in three equally spaced peripheral sections, an elastically yielding raceway convexity 18 deviating from the circular shape, so that three gaps 20 are formed between a reception bore 19 of the valve bushing 12 and the outer bearing ring 17. With its peripheral sections 21 which do not deviate from the circular shape, the outer bearing ring 17 is fixedly pressed into the reception bore 19.

FIG. 2 further shows that in the region of the raceway convexities 18, both the outer bearing ring 17 and the associated peripheral sections of the drive shaft 5 comprise angular grooves 22, 23 which are situated opposite each other in radial direction, and needle rollers 24 are arranged between these grooves. FIG. 2 shows the centering device, and thus also the rotary slide valve made up of the rotary slide 10 and the valve bushing 12 in the central or neutral position in which the needle rollers 24 guided in a cage 25 are snapped into the associated angular grooves 22 and 23 in the region of the raceway convexities 18. In the event that the resetting of the steering valve into the neutral position is not effected exactly by the torsion bar 1, the needle rollers 24 do not reach their end position, i.e. they do not bear against the groove bottom formed by the angular grooves 22 and 23 of the raceway convexities 18 and the drive shaft 5. In the position of angular displacement, not shown, the needle rollers 24 run up the inclined surfaces of the grooves 22, 23 so that the raceway convexities 18 are displaced toward the reception groove 19, i.e. the outer bearing ring 17 is more strongly pre-stressed and thus produces a corresponding, fine resetting force.

The needle roller bearing 16 of the invention described above is also called a polygonal bearing, and its rigidity depends on the thickness of material of the outer bearing ring 17 irrespective of whether it has flanges or not, and on the heat treatment of the outer bearing ring 17.

Figure 3:
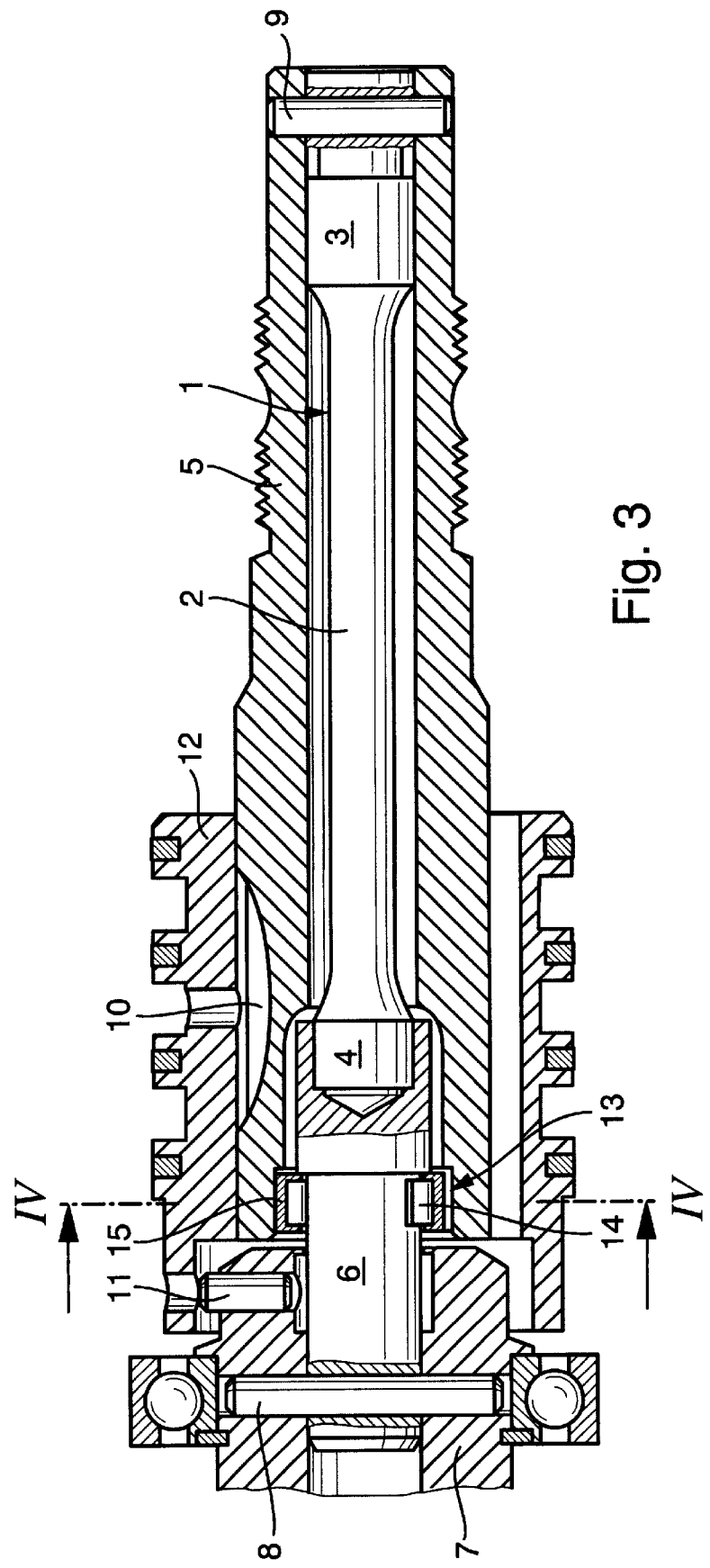
FIG. 3 is a longitudinal cross-section through a further rotary slide valve of the invention.

The centering device shown in FIG. 3 differs from that of FIG. 1 in that the needle roller bearing 16 is omitted and the fine centering in this case is accomplished by the needle roller bearing 13. The method of functioning of this needle roller bearing 13 corresponds to the already described method of functioning of the needle roller bearing 16 of FIGS. 1 and 2 but will be described once again for the sake of completeness.

Figure 4:
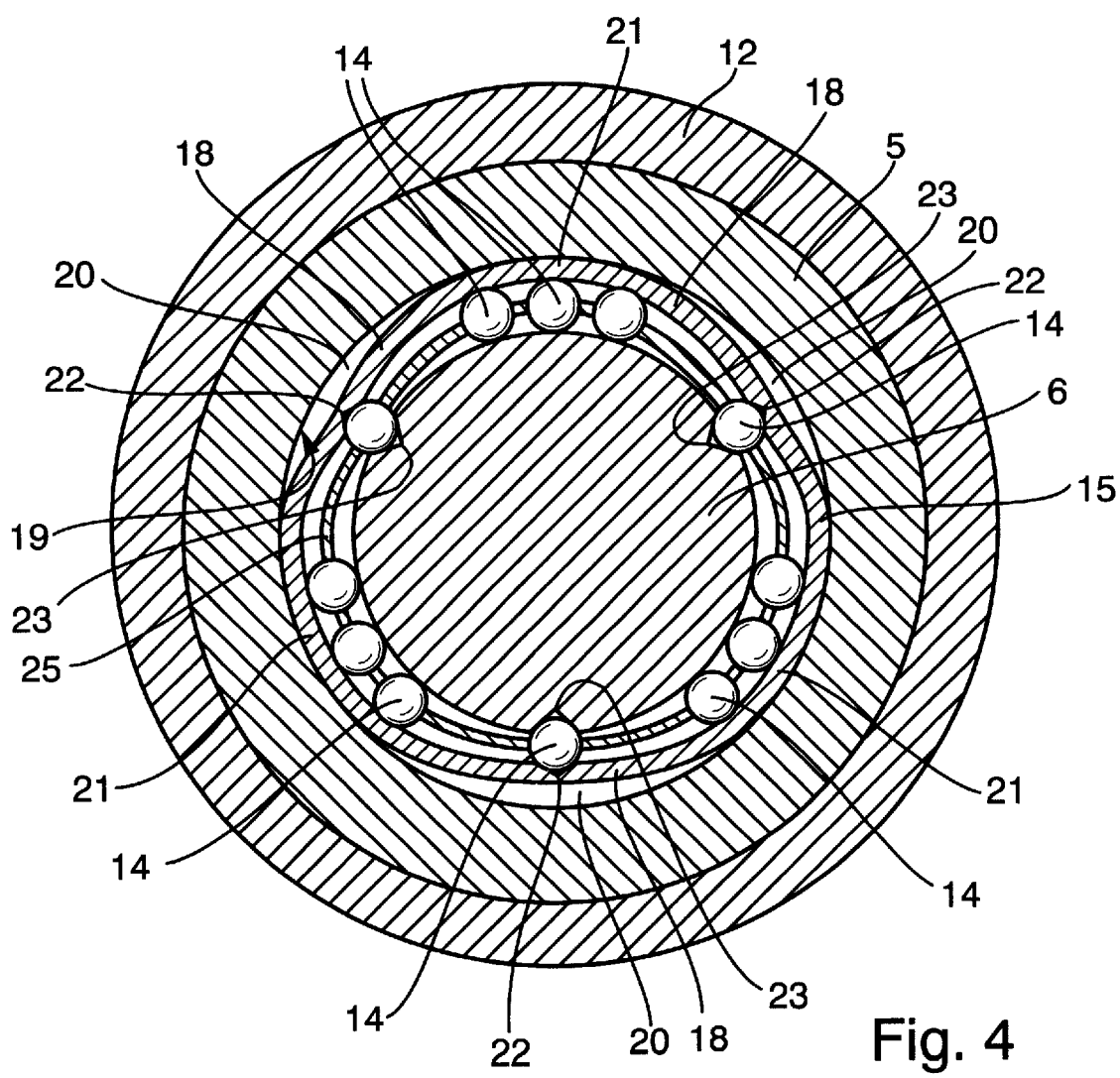
FIG. 4 is a simplified cross-sectional representation along line IV—IV of FIG. 3 showing the region of the centering element in which the needle roller bearing of the invention is arranged.

As can be seen in FIG. 4, the outer bearing ring 15 which is made without chip removal as a sleeve of uniform wall thickness again comprises, in three equally spaced peripheral sections, an elastically yielding raceway convexity 18 deviating from the circular shape, so that three gaps 20 are formed between a reception bore 19 of the drive shaft 5 and the outer bearing ring 15. With its peripheral sections 21 which do not deviate from the circular shape, the outer bearing ring 15 is fixedly pressed into the reception bore 19.

FIG. 4 further shows that in the region of the raceway convexities 18, both the outer bearing ring 15 and the associated peripheral sections of the centering element 6 comprise angular grooves 22, 23 which are situated opposite each other in radial direction, and needle rollers 14 are arranged between these grooves.

Similar to FIG. 2, FIG. 4 also shows the centering device, and thus also the rotary slide valve made up of the rotary slide 10 and the valve bushing 12 in the central or neutral position in which the needle rollers 14 guided in a cage 25 are snapped into the associated angular grooves 22 and 23 in the region of the raceway convexities 18. In the event that the resetting of the steering valve into the neutral position is not effected exactly by the torsion bar 1, the needle rollers 14 do not reach their end position, i.e. they do not bear against the groove bottom formed by the angular grooves 22 and 23 of the raceway convexities 18 and the centering element 6. In the position of angular displacement, not shown, the needle rollers 14 run up the inclined surfaces of the grooves 22, 23 so that the raceway convexities 18 are displaced toward the reception groove 19, i.e. the outer bearing ring 15 is more strongly pre-stressed and thus produces a corresponding, fine resetting force.

What is claimed is:

1. A centering device for a steering valve of an automotive vehicle, said device comprising an elastic torsion bar having a first end portion connected to a drive shaft and a second end portion connected to a driven shaft which is connected to a valve bushing of the steering valve, a rotary slide formed integrally on the drive shaft being inserted in the valve bushing so that, by a limited displacement of the drive shaft relative to the driven shaft, pressure oil can be fed to a servo element, characterized in that a needle roller bearing is arranged between the drive shaft and the valve bushing, said needle roller bearing having an outer bearing ring which is configured as a thin-walled sleeve which comprises, in at least one peripheral section, an elastically yielding raceway convexity deviating from the circular shape, and said peripheral section comprises an angular groove which is situated radially opposite an angular groove disposed in an associated portion of the drive shaft.

2. A centering device of claim 1 wherein the outer bearing ring comprises, in three equally spaced peripheral sections, a raceway convexity deviating from the circular shape.

3. A centering device of claim 1 wherein the angular groove of the drive shaft is formed by a separate inner bearing ring.

4. A centering device of claim 1 wherein the rotary slide is supported on one of a needle roller bearing or a sliding bearing.

5. A centering device for a steering valve of an automotive vehicle, said device comprising an elastic torsion bar having a first end portion connected to a drive shaft and a second end portion connected to a driven shaft which is connected to a valve bushing of the steering valve, a rotary slide formed integrally on the drive shaft being inserted in the valve bushing so that, by a limited displacement of the drive shaft relative to the driven shaft, pressure oil can be fed to a servo element, said rotary slide being supported on cage-guided needle rollers of a needle roller bearing, characterized in that a centering element received in a needle roller bearing and connected to the driven shaft and the torsion bar is arranged between the driven shaft and the torsion bar, said needle roller bearing having an outer bearing ring which is configured as a thin-walled sleeve which comprises, in at least one peripheral section, an elastically yielding raceway convexity deviating from the circular shape, and said peripheral section comprises an angular groove which is situated radially opposite an angular groove disposed in an associated portion of the drive shaft.

6. A centering device of claim 5 wherein the outer bearing ring comprises, in three equally spaced peripheral sections, a raceway convexity deviating from the circular shape.

7. A centering device of claim 5 wherein the torsion bar and the centering element are configured in one piece with each other.

8. A centering device of claim 5 wherein the angular groove of the centering element is formed by a separate inner bearing ring.

* * * * *